C. R. MABEE.
CENTRIFUGAL SEPARATOR AND EVAPORATOR.
APPLICATION FILED AUG. 31, 1912.
1,420,642.
Patented June 27, 1922.
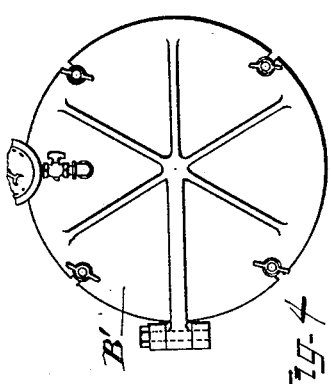
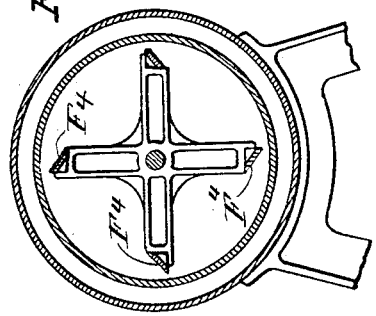
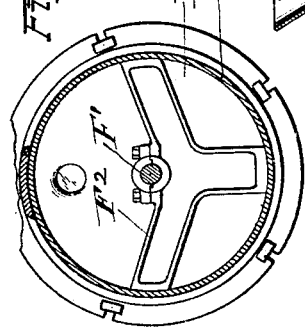
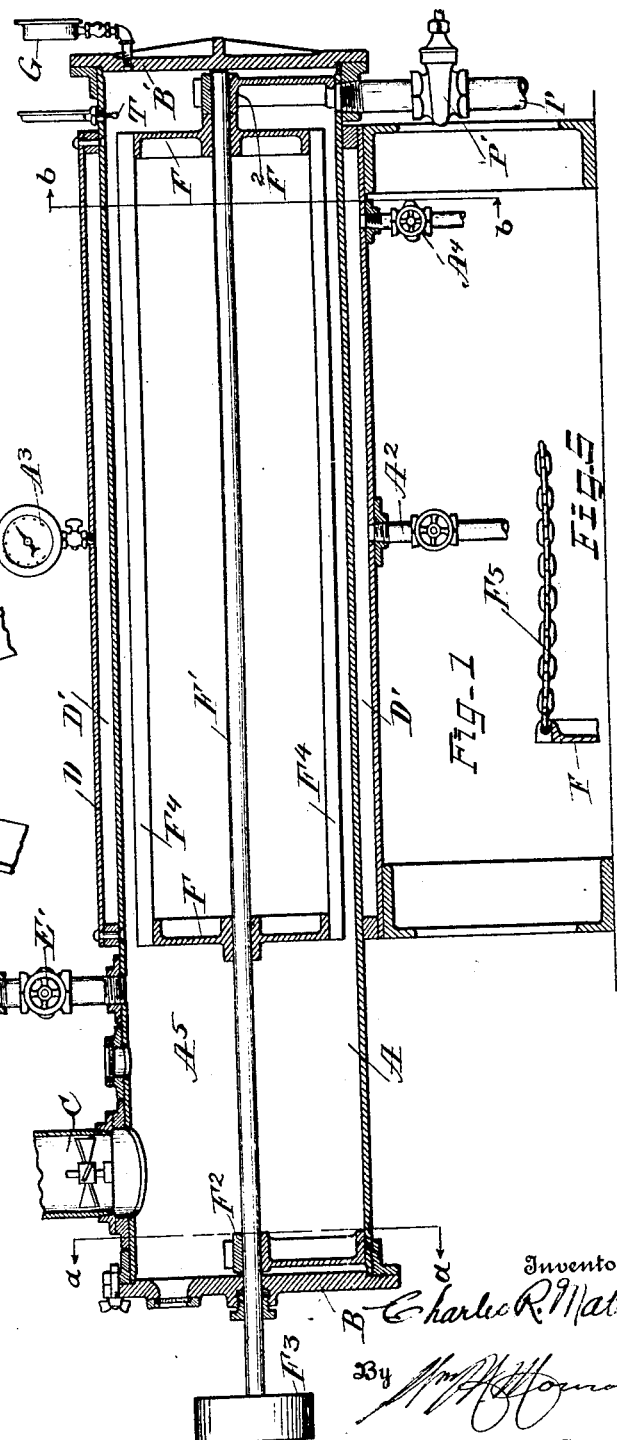

UNITED STATES PATENT OFFICE.

CHARLES R. MABEE, OF CLEVELAND, OHIO.

CENTRIFUGAL SEPARATOR AND EVAPORATOR.

1,420,642.     Specification of Letters Patent.     Patented June 27, 1922.

Application filed August 31, 1912. Serial No. 718,114.

*To all whom it may concern:*

Be it known that I, CHARLES R. MABEE, a citizen of the United States, and resident of Cleveland, in the county of Cuyahoga and State of Ohio, have invented certain new and useful Improvements in Centrifugal Separators and Evaporators, of which I hereby declare the following to be a full, clear, and exact description, such as will enable others skilled in the art to which it appertains to make and use the same.

The objects of the invention are to provide an efficient easily operated and simple form of construction for a machine for removing the water from salt and sugar solutions and from milk and other products, and for evaporating purposes generally.

Further objects are to provide a form of machine in which the container for the solution and substances to be affected and the heating surfaces and appliances can be easily cleaned and in which the amount of fuel required for heating purposes will be greatly reduced and the fuel can be made more effective.

Heretofore vacuum pans and other appliances in use for removing water from solutions of various kinds have required the employment of skilled labor to operate them. The coils of tubing employed for heating the fluids have been enclosed within cylinders and have been difficult of access for repairs or cleaning. They have been expensive in construction and have required in the several systems a far greater amount of steam to evaporate a pound of water than is required to produce the same results by means of the improved device hereinafter described.

The present invention has more particular reference to means for applying circumferential movement under centrifugal force of a layer of material or substance containing liquid to evaporate or partially evaporate the liquid therefrom and in connection therewith, means are provided for heating and for producing a partial vacuum to which the products are exposed, thus causing the evaporation of water from the solutions while in rapid motion, and at the same time constantly eliminating the vapor of evaporation from the solution by mechanical means and subjecting all minute particles of the solution to the reduced atmospheric pressure by virtue of the constantly changing position of the particles constituting the solution.

The vapors and gases thus produced are conveyed out of the machine by means of a vacuum pump with condenser, or by pressure blower or exhaust fan.

The improved machine further comprises an air tight tube or chamber in which a partial vacuum is maintained and within which the materials to be treated are deposited, means for heating a portion of the tube and means for throwing outwardly the materials against the heating surfaces of the tube and for maintaining them in the form of a thin layer or coating thereon while rapidly moving circumferentially about the inner surface of the tube, and while the vapor of evaporation is mechanically separated from the solution and drawn from the central or axial portion of the tube.

The invention further comprises the combination and arrangement of parts and preferred forms of construction of the various details, as hereinafter described, shown in the accompanying drawings and specifically pointed out in the claims.

In the accompanying drawings Fig. 1 is a longitudinal central section of the device; Fig. 2 is a transverse section thereof on the line *a—a* Fig. 1; Fig. 3 is a transverse section thereof on the line *b—b* Fig. 1; Fig. 4 is an end elevation showing the closure for one end and vacuum gauge; Fig. 5 is a transverse section of the spider showing a chain operatively associated therewith, the chain being adapted to constitute conveyor means and largely take the place of the rigid conveyor means employed in the other embodiment of the invention.

In these views A is the cylindrical tube or chamber provided with air tight heads or closures B, B' which may be detachable as illustrated to form doors for access to the interior of the machine. C is an exhaust tube communicating with the chamber A through which vapors, gases and other products of evaporation are drawn from the chamber.

The necessary devices for exhausting the vapor of evaporation are made of any suitable type and hence need not be illustrated, but are operatively connected with the exhaust pipe C.

A steam jacket D encloses substantially two thirds of the length of the tube A providing an annular space D' into which steam is supplied through a pipe A². A pressure gauge A³ is also supplied to indicate the steam pressures and a drain cock is also provided as shown at A⁴.

The steam jacket is placed nearer one end of the tube A than the other, leaving an unenclosed portion A⁵ the object of which will be further described. The exhaust pipe C communicates with this end of the tube and a funnel or hopper E controlled by means of a valve E' is employed when introducing material into the tube A for treatment.

A thermometer T and vacuum gauge G are also shown attached to the other end of the tube A. A pipe P and valve P' are attached to the tube at the lower right end by means of which a liquid product such as milk is drawn off from the tube after treatment. F, F are spider arms spaced apart, and secured to a shaft F' supported in bearings F², F² at each end of the machine, and rotated at a uniform rate of speed by means of a pulley F³ or other power operating means.

The outer ends of the spider arms are connected by means of suitable appliances for giving a centrifugal movement to the materials to be treated so as to throw the same against the inner surface of the heated tube, and to give them a circumferential movement about the inner surface of the tube.

The appliances for moving the liquid may be blades F⁴ F⁴ as shown in Figs. 1 and 3 or they may be flexible appliances such as the chains shown in Fig. 5 at F⁵.

The appliances which produce centrifugal movement in the liquid correspond in length with the length of the annular steam jacket and coincide in location therewith and the liquid in the unenclosed portion A⁵ of the tube is not lifted from the lower portion of the tube.

The blades F⁴ F⁴ are preferably inclined, so as to give an outward centrifugal force to the fluid in the tube and retain it in close contact with the interior surface of the tube, and the rear surface of each blade is preferably so designed as to obtain as large an opening as possible in the fluid behind the blade as it revolves, and hence provide an additional area subjected to reduced pressure within the tube.

The manner in which the evaporation and drying of the material enclosed in the tube is obtained may be described as follows and may be illustrated by the treatment of milk with which the tube is charged. A vacuum of preferably 26 inches is maintained in the tube which is that ordinarily employed in upright vacuum pans.

The milk is caused to form a layer or film upon the heating surface of the tube by the blades when in rotation, the speed of rotation and the total quantity of contents in the container being properly correlated to the diameter of the tube and the thickness of the film desired. This film absorbs the heat quickly from the jacket owing to the very large heating surface thereof, and the rapid passage of the layer of milk thereover.

As the particles of material under treatment change their location incessantly they are continuously subjected to the reduced atmospheric pressure in the interior of the tube which draws the vapor of evaporation away as fast as the vapor is generated by the heat, reduction of pressure and motion within the tube.

The heavier liquid is separated by the centrifugal force from the gaseous portions and lies more closely in contact with the surface of the tube, and the gaseous portions are quickly removed through the interior of the tube.

A film of superheated gases will be generated between the fluid constituting the layer of liquid and the surface of the tube and be expelled from time to time, greatly accelerating the evaporation of the water from the solution.

When bodies such as the blades or chains pass rapidly through a liquid they carry with them an area of vapor and leave an open partially vacuous space behind them and evaporation is greatly accelerated by this fact.

The chains, when employed, are adapted in the rotary movement thereof, to be forced outwardly into contact with the treating surface of the container, to the end that said treating surface will be maintained in a cleansed and polished condition and free from the adherence of particles of material such as casein, when milk is being treated. I do not, however, herein claim the cleansing device, having presented claims to that subject-matter in my copending applications 40,757, filed July 19, 1915, and 77,996, filed February 12, 1916.

The space A⁵ which is not enclosed by the steam jacket contains no revolving blades or chains, and hence the liquid is left comparatively quiet therein so that the vapors and gases can pass out of the exhaust opening without drawing foam or fine particles of liquid with them.

It is advantageous to convert the watery portion of the material which contacts with the heated metal surface at as low a temperature as possible; and if the temperature of such vapor drops a few degrees, as it tends to drop immediately on entering the vapor zone, it is again condensed into globules of water. The globules, though tending to be suspended, will, if not immediately drawn out from the vapor-collecting zone, contact again with the layer of material, and again require heating and vaporizing. This watery portion of the solution after the circumferential motions under centrifugal force are maintained for a few minutes collects on the inner surface of the layer where the action of the partial vacuum will have the greatest effect in evaporating and carrying it away, and this will be accomplished much more easily than if the vapor of evaporation were compelled to overcome the weight of the liquid before it could rise to the surface from the lower portion of an upright vacuum pan.

It has been ascertained by repeated tests that greater efficiency can be secured in the evaporation of fluids by removing the vapor of evaporation in a direction at right angles to the attraction of gravitation rather than in a direction in opposition to the attraction of gravitation which is the present method in use in vacuum systems.

When the vapor leaves the surface of a liquid in a vertical direction in the ordinary vacuum pans, where there is a depth of liquid of three or four feet and a considerable distance therefrom to the off take pipe, the upward motion is slow in the fluid and the upward movement against gravity after passing through the fluid is slow, and a portion of the vapor condenses into globules and falls back again and it is necessary to reevaporate the same.

In this device the vapor generates from the layer of liquid and is drawn axially and horizontally through the tube and practically at right angles to the attraction of gravity, and hence has far less resistance to overcome from the effects of gravitation, and hence the economy in the use of heat units is greatly promoted.

The speed of evaporation of fluid contained in a vacuum chamber is greatly promoted by the depression below atmospheric pressure, so that water will boil in a vacuum of 26 inches at a temperature of 135° F. The advantage of the phenomena in evaporating and drying milk or other delicate food stuffs is obvious, since the milk will not be chemically changed as would be the case if high temperatures were employed.

In this separating device there is but little adhesion of the milk to the heating surface since the parts are in constant movement and the liquid operated upon is in the form of a layer which passes rapidly over the heating surfaces. For this reason no cooked flavor or odor is imparted to the milk as in the employment of the upright vacuum pans heated from the bottom.

The operation of the conveyor blades is such that the layer of material does not settle but accumulates on the cylindrical surface of the container and has a continuous movement over said surface. A hollow space or quiet zone is maintained within the rim of material into which the heated gases and vapors escape to be taken off through the exhaust tube C.

It will be appreciated that since the inlet for the material is arranged adjacent one end of the container, whereas the outlet is arranged adjacent the opposite end, the movement of the material while in layer formation, under the action of the conveyor blades is in a direction circumferentially as well as simultaneously endwise towards the discharge end of the container, and assuming that the valve P' is open, the treated material will be continuously discharged from the container.

I have in other, co-pending, applications illustrated and described modified forms of evaporating or condensing apparatus, and modified methods of procedure when performing the work of evaporating or condensing.

The application Serial No. 277,904, filed February 18, 1919, has a divisional relationship with respect to the present application, the claims therein being directed to the method employed.

In application No. 738,178, filed December 23, 1912, I illustrated a mechanism having some features in common with the present one, but also illustrating how the film or layer can, at both of its ends, be sharply defined, as, for example, by extending a wall or abutment radially inward from the container wall.

In application Serial No. 805,598 (division of Serial No. 797,087, renewed as 108,956), filed December 9, 1913, I have shown and described a mechanism of modified form: and in application Serial No. 797,087, filed October 24, 1913, I illustrated and described the method of procedure which is followed in using an apparatus such as shown in said No. 805,598; in this case the material being caused to move axially simultaneously with its circular movements.

In applications No. 40,757, filed July 19, 1915, and No. 77,996, filed February 12, 1916, respectively, I presented a modified mechanism and the method which is followed in employing it, their subjects matter involving film-forming and moving devices which cause the movement of the film or layer circularly and also axially, together with devices for cleansing and polishing the surface of the container, and devices to remove the gases, vapors and air from the central vapor zone, and project such gases and vapors rapidly through a duct by the use of suitable mechanisms.

And I do not herein claim the subjects matter presented by the claims in any of said several co-pending applications.

Having described the invention what I claim as new and desire to secure by Letters Patent is:

1. In an evaporating apparatus the combination of a substantially horizontally disposed closed tubular container for the material to be treated, said container having heated and unheated portions, said container also having an inlet for the material adjacent one end and an outlet adjacent the opposite end, appliances for heating a circumferential portion of the container, appliances for producing a partial vacuum therein, and appliances for giving a circular layer formation to the material in said heated portion and maintaining a circumferential movement of said layer upon the inner surface of the heated portion of the container, said last mentioned appliances being confined to the heated portion only of the container, whereby a quiet unheated portion for the escape of vapors is maintained.

2. In an evaporator, and in combination, a horizontal tube closed at both ends and containing the material to be treated, externally applied means for heating the same, said tube having an inlet for the material at one end, and an outlet adjacent the opposite end, means for producing a partial vacuum therein, appliances within that portion of said tube having the outlet for producing a continuous circumferential movement of a layer of said material within the tube while said layer of material is maintained in contact with the inner surface of the tube, a considerable portion of the tube having the inlet projecting beyond said appliances whereby to maintain a quiet zone at the inlet end of the tube, and means for rotating said appliances.

3. In an evaporator of the character described, the combination of a horizontally disposed cylindrical container closed at both ends and having a heated portion and an unheated portion, means for giving a forcible movement to the liquid contained in the heated portion of said container to separate vapors of evaporation from the substance under treatment, the said means serving also to spread the fluid in a thin layer upon the heated portion of the container and to give a continuous circumferential movement to the fluid around the same, the unheated portion of the container being adjacent the inlet end thereof, and said means terminating with the heated portion, and means for exhausting the vapors in an axial direction from said container through the unheated portion thereof as it is evaporated and separated in radial direction from the said layer of fluid.

4. In an evaporating apparatus, the combination of a horizontally disposed stationary cylindrical container closed at its ends and having an inlet and outlet for the material to be treated, means for regulating the temperature of the container, conveyor mechanism arranged within the container comprising a skeleton drum having a series of horizontally disposed blades adjacent to but separated from the surface of the container, means for rotating said conveyor mechanism at a high speed, the parts being constructed and arranged whereby a uniform layer of material is maintained in contact with the surface of the container while subjected to continuous movement thereover, and means permitting the vapors to escape from the container.

5. In an evaporating apparatus, the combination of a heated container circular in cross-section, means for regulating the temperature of the wall thereof, mechanism for supplying the material to be treated, mechanism for forcing the substance outward centrifugally towards said wall to form thereon a stratum surrounding an open axial chamber of relatively large diameter, and for positively moving the stratum circularly over the surface of said wall, said parts being arranged and operating to force relatively large volumes of vapor inward into said axial chamber, said chamber having a relatively widely expanded escape passage at one end of the layer, and of cross area approximating the cross area of said chamber adapted to permit said vapor volumes to rapidly escape therethrough.

6. In an evaporating apparatus, the combination of a cylinder having a copious opening at one end, means for regulating the temperature of the wall thereof, means for applying and continuing under movement a continuous layer of material to be treated on and over the cylindrical surface, and for maintaining a central quiet zone within said layer, said cylinder having a copious opening at one end of the said layer for the free escape of vapor and also an opening permitting the discharge of the treated material independently of the vapors, the area of the discharge opening for the treated material being relatively small compared to the area of the opening for the vapor escape, and permitting volumes of vapor to pass out from said zone relatively much larger than the small stream of material passing through said opening after treatment.

In testimony whereof, I hereunto set my hand this 22nd day of August, 1912.

CHARLES R. MABEE.

In presence of—
 WM. M. MONROE,
 RALPH BLUE.